US009969635B2

(12) United States Patent
Kaldate et al.

(10) Patent No.: US 9,969,635 B2
(45) Date of Patent: May 15, 2018

(54) DOWNFLOW DENITRIFICATION SYSTEM

(71) Applicant: Infilco Degremont, Inc., Richmond, VA (US)

(72) Inventors: Amit Kaldate, Glen Allen, VA (US); Mudit Gangal, Richmond, VA (US); John Dyson, Henrico, VA (US)

(73) Assignee: Infilco Degremont, Inc., Richmond, VA (US)

( * ) Notice: Subject to any disclaimer, the term of this patent is extended or adjusted under 35 U.S.C. 154(b) by 0 days. days.

(21) Appl. No.: 13/678,194

(22) Filed: Nov. 15, 2012

(65) Prior Publication Data

US 2013/0126412 A1 May 23, 2013

Related U.S. Application Data

(60) Provisional application No. 61/561,418, filed on Nov. 18, 2011.

(51) Int. Cl.
*B01D 24/00* (2006.01)
*B01D 24/46* (2006.01)
(Continued)

(52) U.S. Cl.
CPC ............ *C02F 3/286* (2013.01); *C02F 3/2806* (2013.01); *C02F 3/2826* (2013.01); *C02F 3/305* (2013.01);
(Continued)

(58) Field of Classification Search
CPC ...... B01D 24/14; B01D 23/24; B01D 24/007; B01D 23/16
(Continued)

(56) References Cited

U.S. PATENT DOCUMENTS 3,293,174 A 12/1966 Robjohns
3,709,364 A 1/1973 Savage
(Continued)

FOREIGN PATENT DOCUMENTS

CN 101734829 A 6/2010
CN 101987759 A 3/2011

OTHER PUBLICATIONS

"Separation Methods for Waste and Environmental Applications", 1999, Marcel Dekker, p. 152.*
(Continued)

*Primary Examiner* — Claire A Norris
(74) *Attorney, Agent, or Firm* — Landmark Intellectual Property Law, PLLC

(57) ABSTRACT

In general, the present invention is directed to systems for treating water or wastewater. In accordance with some embodiments of the present invention, the system may utilize a vessel with a plurality of filter beds, at least one inlet, and at least one outlet, and the system may include: a first filtration bed comprising a first granular and/or angular media, the first media having a high surface area and configured for biological and physical treatment of the water or wastewater; a second filtration bed including a second granular and/or angular media, the second media having a lower surface area than the first media; wherein the water or wastewater enters the vessel via the at least one inlet, flows through the first filtration bed and the second filtration bed, and exits the vessel through the at least one outlet.

17 Claims, 3 Drawing Sheets

INFLUENT 20
CARBON SOURCE 41
BACKWASH WASTE 51
10
FIRST GRANULAR MEDIA 11
SECOND GRANULAR LAYER 12
THIRD LAYER / GRAVEL 13
NOZZLES 14
EFFLUENT 30
AIR SCOUR 43
BACKWASH WATER 42

(51) Int. Cl.
*B01D 29/62* (2006.01)
*C02F 3/10* (2006.01)
*C02F 3/28* (2006.01)
*C02F 3/30* (2006.01)
*C02F 101/16* (2006.01)

(52) U.S. Cl.
CPC .... *C02F 2101/163* (2013.01); *C02F 2303/16* (2013.01); *Y02E 50/343* (2013.01)

(58) Field of Classification Search
USPC ........ 210/617, 903, 618, 261, 610, 275, 290
See application file for complete search history.

(56) References Cited

U.S. PATENT DOCUMENTS

| | | | | |
|---|---|---|---|---|
| 3,853,752 | A | 12/1974 | Tymoszezuk | |
| 3,925,202 | A * | 12/1975 | Hirs | 210/795 |
| 3,928,190 | A | 12/1975 | Bebin | |
| 3,994,803 | A | 11/1976 | Neff et al. | |
| 4,009,105 | A | 2/1977 | Jeris | |
| 4,056,465 | A | 11/1977 | Spector | |
| 4,069,156 | A | 1/1978 | Mason | |
| 4,153,510 | A | 5/1979 | Messing et al. | |
| 4,159,945 | A | 7/1979 | Savage | |
| 4,179,374 | A | 12/1979 | Savage et al. | |
| 4,250,033 | A | 2/1981 | Hickey et al. | |
| 4,267,038 | A | 5/1981 | Thompson | |
| 4,277,341 | A | 7/1981 | Wise et al. | |
| 4,351,729 | A | 9/1982 | Witt | |
| 4,415,454 | A | 11/1983 | Fuchs | |
| 4,604,197 | A | 8/1986 | Louboutin et al. | |
| 4,731,185 | A | 3/1988 | Chen et al. | |
| 4,765,892 | A * | 8/1988 | Hulbert et al. | 210/290 |
| 4,780,198 | A | 10/1988 | Crawford et al. | |
| 4,863,606 | A | 9/1989 | Ryall | |
| 4,915,841 | A | 4/1990 | Lagana et al. | |
| 4,917,802 | A | 4/1990 | Fukaya et al. | |
| 4,997,568 | A | 5/1991 | Vandervelde et al. | |
| 5,055,186 | A | 10/1991 | Toever | |
| 5,137,636 | A | 8/1992 | Bundgaard | |
| 5,156,742 | A | 10/1992 | Struewing | |
| 5,211,811 | A | 5/1993 | Hattori et al. | |
| 5,211,847 | A | 5/1993 | Kanow | |
| 5,288,407 | A | 2/1994 | Bodwell et al. | |
| 5,525,230 | A | 6/1996 | Wrigley et al. | |
| 5,651,892 | A * | 7/1997 | Pollock | 210/605 |
| 5,681,471 | A | 10/1997 | Silverstein | |
| 5,747,311 | A | 5/1998 | Jewell | |
| 5,776,344 | A * | 7/1998 | McCarty et al. | 210/605 |
| 5,798,044 | A | 8/1998 | Strohmeier et al. | |
| 6,146,531 | A * | 11/2000 | Matheson | C02F 3/2806 210/606 |
| 6,365,048 | B1 * | 4/2002 | Masten et al. | 210/610 |
| 6,767,464 | B2 | 7/2004 | Boyd et al. | |
| 6,881,339 | B1 | 4/2005 | Hogl et al. | |
| 6,896,805 | B2 | 5/2005 | Austin | |
| 7,001,519 | B2 | 2/2006 | Linden et al. | |
| 7,022,233 | B2 | 4/2006 | Chen | |
| 7,014,769 | B1 | 5/2006 | Cox et al. | |
| 7,087,169 | B2 | 8/2006 | Austin | |
| 7,144,509 | B2 | 12/2006 | Boyd et al. | |
| 7,309,434 | B2 | 12/2007 | Potts | |
| 7,632,439 | B2 | 12/2009 | Mullette et al. | |
| 2007/0221582 | A1 | 9/2007 | Holland et al. | |
| 2009/0294356 | A1 | 12/2009 | Beggs | |

OTHER PUBLICATIONS

McWhan, "Sand and Silicon: Science that Changed the Word," 2012, Oxford University Press, p. 41.*
Written Opinion of the International Searching Authority (6 pages); Date of Completion May 16, 2013.
International Search Report for PCT/US2012/065454.

* cited by examiner

DOWNFLOW DENITRIFICATION SYSTEM

RELATED APPLICATIONS

The present application claims priority to U.S. Provisional Patent Application No. 61/561,418, filed on Nov. 18, 2011, which is incorporated herein by reference in its entirety.

BACKGROUND OF THE INVENTION

The present invention is generally directed to downflow denitrification system utilized to treat water and/or wastewater. More specifically, the present invention is directed to a downflow system utilizing at least two different types of media with multiple bed depths for effective nitrate removal and suspended solid capture.

Treatment of water and/or wastewater, such as sewage, is well known in the art. Treatment systems and methodologies range from simply filtering the water, wastewater, or sewage through a filter bed comprised of sand to spreading the water, wastewater, or sewage and allowing the solids to dry before gathering.

Water and/or wastewater may typically comprise, among other pollutants, nitrogen and suspended solids. It is desirable to remove both nitrogen and suspended solids from treated water and/or wastewater before recycling or reintroducing treated water and/or wastewater into the environment.

Often, for pollution control there are limitations placed on the discharge of nitrogen compounds in treated sewage effluent into streams. Accordingly, much attention has been paid to optimizing denitrification systems. Biologically active filters have become emerging solutions for wastewater treatment facilities that face stringent nutrient regulations with constraints imposed by cold climate conditions or footprint limitations. Such biologically active filters (BAFs) are often more resilient in cold weather conditions when compared to conventional activated sludge systems. Moreover, BAFs require less space, and are often the smallest choice—while maintaining efficient functionality—when compared to alternative systems such as activated sludge and its many variations.

Removal of nitrogen from waste water by the use of nitrifying and denitrifying bacteria generally involves conversion of organic nitrogen and ammonia into nitrates, followed by removal of the nitrates by denitrifying microorganisms to yield nitrogen gas. Converting organic nitrogen and ammonia to nitrates requires adequate aeration and typically results in removal of carbon from the system. Because carbon is required in the denitrification process, it is typically reintroduced into the system by the addition of external carbon source, for example methanol. The introduction of external carbon source generally results in the production of nitrogen gas, carbon dioxide, and water.

Moreover, such biological reduction accomplished by the denitrifying microorganisms occurs on the surface area of the filter media, to which denitrifying microorganisms have attached. Accordingly, it is desirable to provide a filter media that has a large surface area in order to support larger amounts of denitrifying microorganisms. However, such filter media often lacks the ability to effectively capture suspended solids that may also be present in water and/or wastewater.

The use of a filter bed comprising gravel or sand, to which denitrifying microorganisms may be added as a means for treating and denitrifying water and/or wastewater is known in the art. However, in addition to the drawbacks noted above, such deep bed filtration systems are often difficult to use in existing and future treatment facilities because of the large size requirements of such systems. Space restrictions for water and/or wastewater treatment facilities coupled with growing treatment demands as populations grow have resulted in a need for more effective, efficient water or wastewater denitrification systems that occupy a smaller footprint than previous systems.

Accordingly, it is desirable to provide a water and/or wastewater denitrification system that can effectively and efficiently remove both excess nitrates and suspended solids from water and/or wastewater while not increasing the footprint required for such system.

SUMMARY OF THE INVENTION

Aspects of the invention may include a system for treating water or wastewater, the system utilizing a vessel with a plurality of filter beds, at least one inlet, and at least one outlet, the system comprising: a first filtration bed comprising a first granular and/or angular media, the first granular and/or angular media having a high surface area and configured for biological and physical treatment of the water or wastewater; a second filtration bed comprising a second granular and/or angular media, the second granular and/or angular media having a lower surface area than the first granular and/or angular media; wherein the water or wastewater enters the vessel via at least one inlet, flows through the first filtration bed and the second filtration bed, and exits the vessel through at least one outlet.

Other aspects of the present invention may include a water or wastewater treatment system for removing nitrates from water or wastewater, the system comprising: an influent inlet for receiving water or wastewater from a source outside of the treatment system; a vessel for containing the water or wastewater, the vessel comprising: a first filtration bed comprised of a first filtration media; a second filtration bed comprised of a second filtration media, the second filtration bed supporting the first filtration bed; and a support bed, the support bed supporting the second filtration bed; one or more nozzles providing fluid communication between the vessel area adjacent to the support bed and the system outlet, the nozzles providing an exit for effluent after traveling through the vessel; an effluent outlet, for removing treated water or wastewater from the system; one or more inlets for the introduction of air scour and backwash water into the vessel, the inlets providing air scour and backwash water through the nozzles into the support bed, into the second filtration bed, and subsequently into the first filtration bed.

These and other aspects will become apparent from the following description of the invention taken in conjunction with the following drawings, although variations and modifications may be effected without departing from the spirit and scope of the novel concepts of the invention.

BRIEF DESCRIPTION OF THE DRAWINGS

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which.

DETAILED DESCRIPTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

The present invention is generally directed to downflow denitrification system utilized to treat water and/or wastewater. More specifically, the present invention is directed to a downflow system utilizing two different types of media for effective nitrate removal and suspended solid capture. In accordance with some embodiments of the present invention, the system may be a shallow bed downflow system. In accordance with some embodiments, the present invention discloses a submerged biological, downflow denitrification system comprising a fixed, dense granular and/or angular bed with influent water or wastewater flowing in the downward direction by gravity. The denitrification and filtration process may be considered a tertiary treatment system capable of $NO_x$—N ($NO_3$—N plus $NO_2$—N) and suspended solids removal from secondary treated effluent.

The denitrification and filtration system may provide (i) a single layer of granular and/or angular media for biomass attachment and retention of suspended solids; (ii) the use of high surface area media to ensure a larger microorganism population compared to the same volume of other media types (e.g. sand), thereby potentially enabling a higher pollutant removal rate; (iii) upflow, counter-current distribution of air during backwash; and (iv) automated backwash sequences optimized per application requirements.

Figure 1:
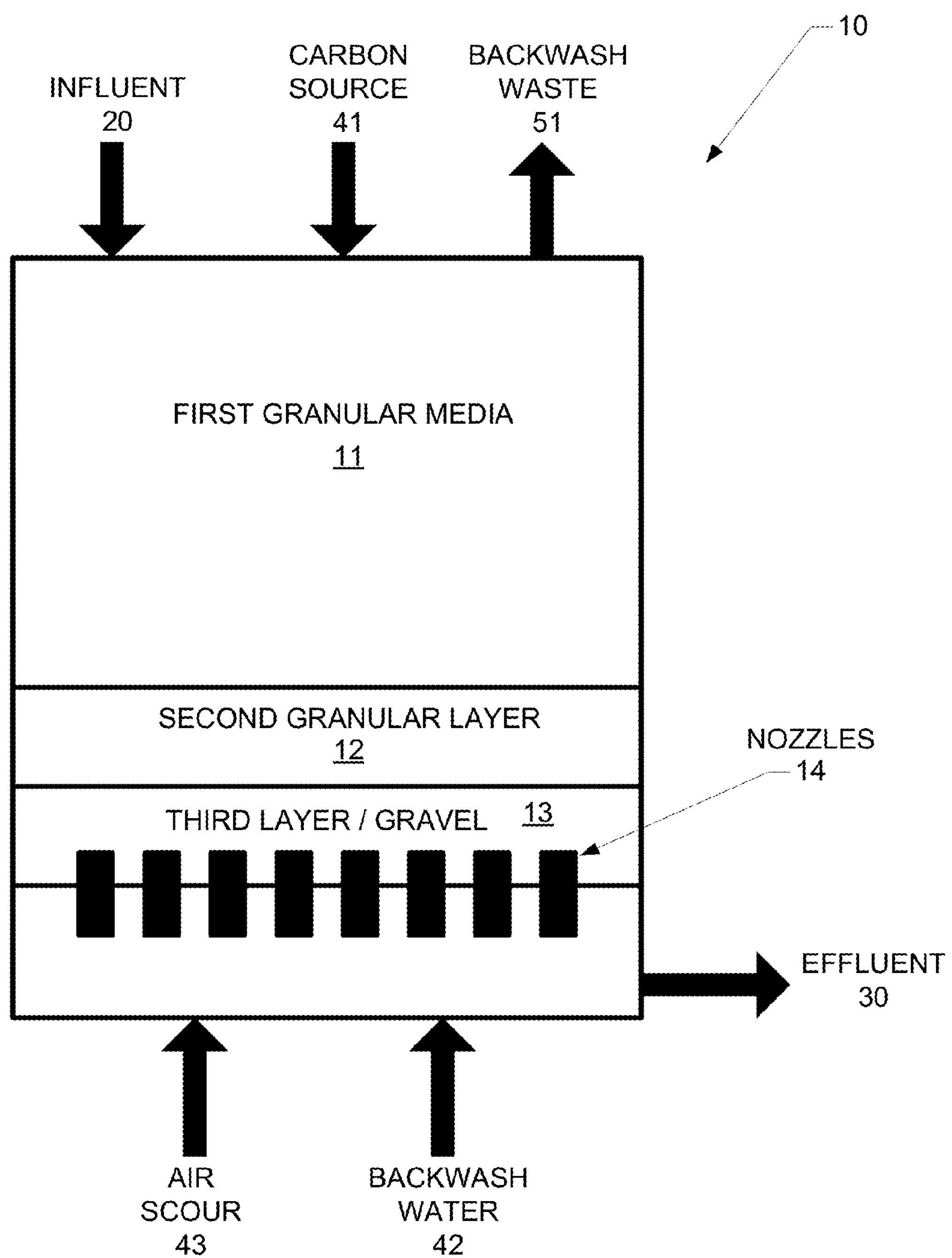
FIG. 1 is a depiction of a dual media downflow denitrification system in accordance with some embodiments of the present invention.

With reference to FIG. 1, a downflow denitrification system 1 will now be discussed. Downflow denitrification filter system 10 receives water and/or wastewater to be treated, or influent 20, and following treatment discharges effluent 30. In general, the downflow denitrification filter system 10 comprises at least two (2) media types, sized and configured to assist in the support and fostering of microorganisms that assist in the denitrification process and assist in the removal of various suspended solids. With reference to FIG. 1, the embodiment depicted utilizes a layer of high surface area media 11 that comprises sufficient surface area for microorganisms to attach and grow. High surface area filter media such as that marketed under BIOLITE™ by the present assignee INFILCO-DEGREMONT may be used. BIOLITE™ media is an expanded clay material with a high specific surface area, a low density, and a good resistance to attrition. BIOLITE™ has a porosity that ensures biomass attachment, and ranges in size from 1 mm to 5 mm. BIOLITE™ L2.7 was utilized in testing, which may have a particle size ranging from 2 mm to 3 mm. In addition, a second layer comprising a different sized media 12 may also be included.

The high surface area filter media 11 hosts various microorganisms which, under proper circumstances, remove nitrogen oxides from the influent 20. The second layer 12, which may comprise for example, sand, may be a different filter media and may capture suspended solids present in the influent 20.

However, the use of sand or other materials as the second filter media in the second layer 12 may also assist with the support of microorganisms, and may therefore assist in the removal of nitrates from the influent 20. Accordingly, the second layer 12 may perform the function of both capturing suspended solids and further polishing the effluent for additional nitrate removal.

Various sized media may be utilized for the second layer 12. The sizing of the media may be selected so as to provide desired void sizes between the media particles which may capture suspended solids in the water and/or wastewater. However, it is contemplated that sand may be used having a particle size of 0.1 mm to 10 mm. More specifically, sand with a particle size of 0.5 mm to 2.5 mm may be used.

Moreover, the ratio in depth of the first layer 11 to the second layer 12 may vary depending on the particular application and performance characteristics sought of the system 1. However, it is contemplated that the first layer 11 may be greater in thickness than 1.5 feet, and the second layer 12 may comprise a minimum of 11% of the total bed thickness.

In addition to the first and second layers 11, 12, the downflow denitrification filter system 10 may further comprise a third layer 13 whose primary function is to support the second layer 12. The third layer 13 may be comprised of any number of materials in any number of sizes and shapes. For example, the third layer 13 may be comprised of gravel with a particle size between 2 mm and 50 mm. More specifically, the third layer 13 may be comprised of gravel with a particle size between 6 mm and 18 mm.

The influent 20 (for example a secondary treated influent water and/or wastewater) may enter the downflow denitrification filter system 10, and may be forced to pass through the first and second filter layers 11 and 12, the supporting layer 13, and may be pushed out of the filtration layers 11, 12 through nozzles 14. At this point, effluent 30 may exit the system. Because the downflow denitrification filter system 10 is a downflow system, the influent may pass through the filtration layers 11, 12, through the force of gravity alone. Alternatively, an external force or pressure may be applied.

In order for the microorganisms present on the filter media 11 to efficiently and fully remove the nitrates from the influent 20, a carbon source must be present. Accordingly, the downflow denitrification filter system 10 may further comprise a carbon source input 41. While various carbon sources may be utilized, it is common for methanol to be used. Methanol may be utilized as the carbon source, although ethanol or acetate may also be used. During operation, the microorganisms may utilize nitrates present in the influent 20 as an electron acceptor when consuming the carbon source. Because of the conditions maintained in the denitrification filter system 10, the microorganisms present on the filter media may respire nitrates present in the influent 20 since there is no oxygen present. The carbon source may act as an electron donor, causing reduction of the nitrates. This process may result in $N_2$ being formed thereby eliminating various nitrogen species ($NH_3$—N, $NO_2$—N, $NO_3$—N).

During use of the system 1, suspended solids in the influent 20 are removed primarily through entrapment within the filter media. However, as influent 20 is passed through the filter media, suspended solids may accumulate within the media. Such accumulation may result in headloss or even suspended solids passing through the filter media unchecked causing unacceptable turbidities in the effluent 30. Accordingly, it is often necessary to remove the trapped particles from the filter media. Accordingly, system 1 may comprise a backwash water inlet 42 to assist in the removal of such trapped solids.

Backwash water may be fed via backwash water inlet 42 upward through the filtering media. As the backwash water is input into the filter media, it may lift the media causing the bed to expand and assume a fluidized state. Such expansion and fluidization may cause entrapped solids to become released and flushed out of the media. Backwash waste may be gathered and may be removed from the system via backwash waste outlet 51. Backwash waste may be treated separately, or may be gradually added to the influent 20.

However, depending on the specific application and use of the system 1, backwash water alone may not adequately remove entrapped suspended solids from the filtration media. In such cases, additional techniques may be required. Accordingly, downflow denitrification system 10 may further comprise an additional input for removing entrapped solids 43. Such additional inlet 43 may comprise an input for an additional surface wash or air scour. Air scour systems generally operate by pumping air through the bottom of the filter media prior to or after or along with water during backwash. Because the air introduced by the air scour system is less dense than the water introduced by the backwash, air bubbles may travel at a greater velocity increasing the turbulence and assisting with the removal of entrapped solids by partially or fully fluidizing the bed and allowing the media particles to detach the biomass growing on them.

Greater solids capture may be achieved due to the downflow arrangement of the system 1 coupled with regular backwashes carried out in counter current direction to remove excess biomass and entrapped solids.

Backwash sequences for biological filters must comply with several requirements: (i) the entire filter bed must be cleaned of retained solids and excess biomass; (ii) there must be sufficient biomass remaining in the reactor following a backwash; (iii) air and water flows must not cause filter media to be lost; (iv) water and energy consumption must be minimized; and (v) the backwash sequence must be initiated and carried out automatically.

The standard backwash sequence utilized in conjunction with the downflow denitrification system 1 has been developed specifically to meet such requirements. The backwash sequence may be optimized during start-up and can be modified based on operating experience. The sequence may be initiated manually, on operating time, or upon reaching a pre-set differential headloss.

The main steps of the sequence are: (1) reduce water level to prevent media loss and quick drain to backflush the underdrain nozzles; (2) water rinse (3); air scour; (4) series of simultaneous air/water washes; and (5) water rinse (6) air purge (7) filter-to-waste. The water used for backwashing is typically treated effluent that is stored in a separate clean water tank. Backwash water and/or wastewater is normally stored in a separate holding tank and pumped over time back to the head of the treatment plant. In addition to the regular backwashes, mini backwashes known as Nitrogen Gas Release may be carried out. These are short, water only backwashes designed to remove the nitrogen bubbles that are developed during the course of a filter run during the process of denitrification of the Nitrates to release Nitrogen gas which gets trapped in the bed interstices. These Nitrogen bumps help increase filter run times and allow a smoother operation and efficient treatment.

Description of Operation.

Nitrified effluent from existing treatment train may be fed to the influent channel for the downflow denitrification and filtration units and may be evenly distributed to the cells through a series of weirs. Water and/or Wastewater to be treated may flow by gravity over the influent weirs and down through the media (e.g., BIOLITE™ media). As the water and/or wastewater flows through the media, attached biomass may reduce nitrate-nitrogen in the water and/or wastewater to nitrogen gas, which may be released to atmosphere. This stage may not require any external aeration. However, the biomass may be attached to the media and may utilize an external carbon source, such as methanol, as its electron donor source. Carbon source may be added in the channels feeding the reactors or in the reactors directly.

Due to solids retention and biomass growth within the filter media, backwashing of the units may be necessary to remove retained solids and maintain a thin, active biofilm on the media. Backwashing may be initiated either manually or automatically, based upon elapsed time or on reaching a pre-set differential headloss. The backwash sequence includes a number of distinct steps, the duration and extent of each step being optimized during plant start-up and modified based on operating experience.

The basic backwash sequence includes the following steps: (1) quick drain to backflush the underdrain nozzles; (2) rinse; (3) air scour; (4) combination air and water backwash; (5) water rinse; (6) air purge; and (7) water rinse with influent water and/or wastewater (filter to waste).

Additional, periodic water-only Nitrogen Gas Release may also be carried out to eliminate the head buildup due to the entrapment of Nitrogen bubbles in the bed interstices during the course of the denitrification process during the filter run.

A pump from a clearwell may supply clean water used for backwashing the filter. The backwash water flow rate may be controlled with an automatic flow control valve and/or variable frequency drive while a positive displacement or centrifugal blower supplied air may be used for the air scour. Spare, installed units may be provided for both the air scour blower and backwash water supply pump.

Water and/or wastewater from the quick drain step may be collected in a drain sump and typically may flow into the backwash waste tank. Water and/or wastewater from the remaining steps may collect in a common backwash flume and flows to the backwash waste storage tank. Stored backwash water and/or wastewater is normally returned to the head of the plant Testing.

Downflow denitrification systems in accordance with some embodiments of the present invention have been tested at various facilities. Discussed below are some of the instrumentation, process, testing, and results of such tests.

Note that such tests are exemplary and do not alone encompass the entirety of the present invention.

Testing Objective.

In general, tests were conducted to evaluate the performance of downflow denitrification systems with respect to: (i) effluent $NO_x$—N concentration; (ii) effluent total nitrogen; (iii) effluent TSS and turbidity; and (iv) backwash. The impacts on performance of the following parameters were also evaluated: (a) hydraulics; (b) media depth; and (iii) temperature.

Site Description.

The plant used as test site has a treatment capacity of 5 MGD. The plant process line includes influent screening and grit removal, pre-aeration and primary settling tank, aeration and secondary settling tanks, disinfection and final aeration prior to release into a local river. The solids generated by the primary and secondary treatment processes are treated by anaerobic digestion and dried to be eventually disposed as land application. The influent and effluent water qualities for the facility for the first six months of 2010 are presented in the table below.

| Parameters | Influent | Effluent |
|---|---|---|
| pH | 6.9 | 7.5 |
| Alkalinity (mg/l) | 189.8 | |
| $CBOD_5$ (mg/l) | 181.6 | <2 |
| TSS (mg/l) | 200.7 | <4 |
| Phosphorus (mg/l) | 4.9 | 0.7 |
| $NH_3$—N (mg/l) | 25.6 | <0.4 |
| TKN (mg/l) | | 0.8 |
| $NO_x$—N (mg/l) | | 27.2 |

Testing Description.

The testing comprised two modules which are the filter column and control center, which were designed to sustain cold weather conditions. The modules were interconnected for hydraulic purposes with flexible pipeline. The control center contained instrumentation, control desktop and PLC while the filter column incorporated most of the automated valves. Pilot influent was pumped using a submerged pump from the plant secondary effluent into a tank that had the capability to screen TSS to an acceptable concentration if necessary. Influent was pumped from the screen box to the control center where parameters such as turbidity, nitrate, residual DO and temperature were continuously recorded. Before going into the filter column, methanol was injected in the influent stream. Effluent from the filter column gravity flowed to the control center where nitrate concentration was monitored continuously. Finally, the effluent was collected and stored in a tank for the filter column backwash.

Testing of 1' column:

| | |
|---|---|
| Surface Area | 0.07 $m^2$ or 0.785 $ft^2$ |
| Quantity of Gravel Layers | 2 |
| Bottom Gravel Layer | Type I 0.10 m or 4" |
| Top Gravel Layer | Type II 0.20 m or 8" |
| Quantity of Media Depth Tested | 4 |
| First Depth of BIOLITE ™ L2.7 | 2.74 m or 9 feet |
| Second Depth of BIOLITE ™ L2.7 | 1.83 m or 6 feet |
| Third Depth of BIOLITE ™ L2.7 | 1.22 m or 4 feet |
| Fourth Depth of BIOLITE ™ L2.7 | 0.76 m or 2.5 feet |

Media Used.

BIOLITE. L2.7 was selected because both because the denitrification efficiency increases as media size decreases and the spaces between media decrease as media size decreases. This translates into better nitrate and TSS removal capability.

| | |
|---|---|
| Effective Size (ES) | 2.5-2.9 mm |
| Apparent Bulk Density (dapp) | 0.73-0.90 kg/L |
| Particle Density (dr) | 1.45-1.85 kg/L |

Gravel Beds.

Types I and II gravel were used. Type I comprised gravel particles of 19-25.5 mm (¾"-1") Effective Size (E.S.). Type II comprised gravel particles of 9.5-19 mm (⅜"-¾" Effective Size (E.S.).

Criteria of Success.

The criteria of success are achievable and the performance goals were as follows:

| | |
|---|---|
| Effluent TSS | Less than 5.0 mg/L |
| Effluent $NO_x$—N | Less than 1.0 mg/L |

Specifically, the testing sought to achieve: (i) the optimal hydraulic and pollutant loading ($NO_3$—N and $NO_2$—N) rates for each media depth, in order to maintain the effluent $NO_x$—N concentration less than 1.0 mg/L; (ii) the permissible combinations of nitrate and TSS loadings for each media depth in order to maintain a effluent TSS concentration below 5.0 mg/L; (iii) the denitrification efficiency of the media under temperature variation; (iv) the desirable total nitrogen concentration in the effluent; and (v) type of backwash methods The testing was composed of a minimum of 6 phases described as follows:

Phase 1—Media Fill Up Sequences.

The first phase consisted of filling up the filter column with the selected BIOLITE L2.7 media type and recording a Clean Bed Pressure (CBP) set point for each media bed depth tested. Four different media bed depths of 9.0 ft, 6.0 ft, 4.0 ft and 2.5 ft were tested in decreasing high order during the testing. The media loading was organized into four (4) sequences increasing bed high order for practicability. The first media loading sequence was the 2.5 ft bed, second the 4.0 ft bed, third the 6.0 ft bed and the last sequence was the 9.0 ft bed.

The backwash program is designed to trigger a backwash sequence based on three modes: (i) pressure increase; (ii) time; and (iii) effluent TSS concentration. When operating under pressure increase mode the program adds certain headloss to the CBP set point. Therefore, the CBP set point for each of the 4 media depths tested was determined. The filter column was filled with water.

Phase 2—Start Up.

The raw water pump was installed in the effluent channel of the secondary clarifiers and hydraulic and operational checks were performed. The testing was started with very low hydraulic loading of 2.37 gpm/$ft^2$ and nitrate loading of 133 lb/kft$^3$.d. These low loadings were applied for a 2 to 3 weeks period to accommodate for gradual growth of denitrifiers. The start-up period ended after stabilization of denitrification process and steady effluent concentrations of $NO_x$—N<1 mg/L were obtained for at least one (1) week.

Backwash Cycle.

The proposed backwash cycle had a maximum duration of 37 minutes, constituting seven steps described in the table below. Note that the step duration and rate was optimized for each media bed height.

| Step Number | Step Includes | Rate ($gpm/ft^2$; $scfm/ft^2$) | Step Duration (Seconds) |
|---|---|---|---|
| 1 | Quick Drain | Time Based | 80 |
| 2 | Rinse | 4-6 | 300 |
| 3 | Air Scour | 4-6 | 300 |
| 4 | Water + Air | 4-6 | 600 |
| 5 | Rinse | 4-6 | 600 |
| 6 | Air Purge | Time Based | 30 |
| 7 | Filter to Waste | Test Flow Rate | 300 |

Phase 3—Media Bed Depth at 9 ft.

Phase 3 consisted of two stages: (i) identify loading criteria for $NO_x$—N and TSS for a 9 ft media bed depth, and (ii) optimize backwash efficiency. The influent flow rate was gradually increased in order to determine the maximum loading rate between TSS and nutrient that would satisfy the effluent goal concentrations of less than 1.0 mg/L for $NO_x$—N and less than 5.0 mg/L for TSS without backwash efficiency constraint requirement. After identification of the optimal loading rate, the influent was reduced slightly to allow the effluent to stabilize below effluent goal concentrations. Finally, testing ran at constant loading rate to validate denitrification capability of the filter for the chosen loading rate with a minimum backwash frequency of 24 hours. The flow rate was then gradually decreased to the filter until backwash efficiency of less than 2% requirement was obtained.

Phase 4—Media Bed Depth at 6 ft.

Phase 4 started with the removal of approximately 2.36 ft3 of media to reduce bed depth from 9 ft to 6 ft. After media is removed the filter column needed to be controlled for media breakthrough by controlling TSS reduction on effluent. Finally, the 2 stages of loadings for $NO_x$—N and TSS and to optimize backwash efficiency discussed above with regard to Phase 3 were executed.

Phase 5—Media Bed Depth at 4 ft.

Phase 5 began with the removal of approximately 1.57 ft3 of media to reduce bed depth from 6 ft to 4 ft. After media is removed, the filter column needed to be controlled for media breakthrough by controlling TSS reduction on effluent. Finally, the 2 stages of loadings for limitations between $NO_x$—N and TSS and to optimize backwash efficiency discussed above were executed.

Phase 6—Media Bed Depth at 2.5 ft. Phase 6 began with the removal of approximately 1.18 ft3 of media to reduce bed depth from 4 ft to 2.5 ft. After media was removed the filter column needed to be controlled for media breakthrough by controlling TSS reduction on effluent. Finally, the 2 stages of loadings for limitations between $NO_x$—N and TSS, and to optimize backwash efficiency discussed above were executed.

Testing Field Procedures.

Testing was designed to study the performance of the filter with the specific objectives to optimize operating parameters for the pilot with L2.7 media and gravel. The study was conducted in six phases; phases 1 and 2 were the start up while phases 3, 4, 5 and 6 optimized TSS and pollutant removal performance for each of the media bed depth tested.

Experiment Initiation.

First the filter column unit was filled with media and the clean bed pressure recorded for each bed depth tested. Second, the column was started up and operated in lower filtration mode at flow rate of 2.37 $gpm/ft^2$ and nitrate loading of 133 $lb/kft^3$.d. The flow rate was increased daily by small flow increments as long as the effluent removal goals were maintained. The backwash was operated under the 3 possible modes defined by pressure max, time (24 hours) and TSS concentration (effluent TSS<influent TSS). The primary experimental variables were filtration flow rate, nitrate loading, TSS loading and backwash flow rate.

Third, the influent flow was started at 3.14 $gpm/ft^2$ and increased on a daily basis by small increments until one of the two effluent parameters $NO_x$—N or TSS concentrations exceeded the test goals which are respectively 1 mg/L and 5 mg/L.

The following conclusions were determined before advancing: (i) effluent $NO_x$—N less than 1 mg/L; (ii) effluent TSS concentration less than 5 mg/L; (iii) the applicable loading rate; (iv) the percentage removal achieved; (v) the rate of velocity decline between backwash cycles; and (vi) the rate of backwash efficiency increase for loading rate decrease.

Operational Monitoring and Experimental Duration.

Flow and pressure data for the biofilter system was collected on a regular basis to quantify loss of differential pressure with respect to mass loading rate. A lower rate of differential pressure decline suggested that a longer operational run may be achieved.

Evaluation Criteria.

The impact of the filter operational variables on performance was evaluated for each bed depth based on the following criteria: (i) effluent $NO_x$—N; (ii) effluent TSS; (iii) rate of differential pressure decline; (iv) filter run length (estimated backwash frequency); and (v) net water recovery.

Figure 2:
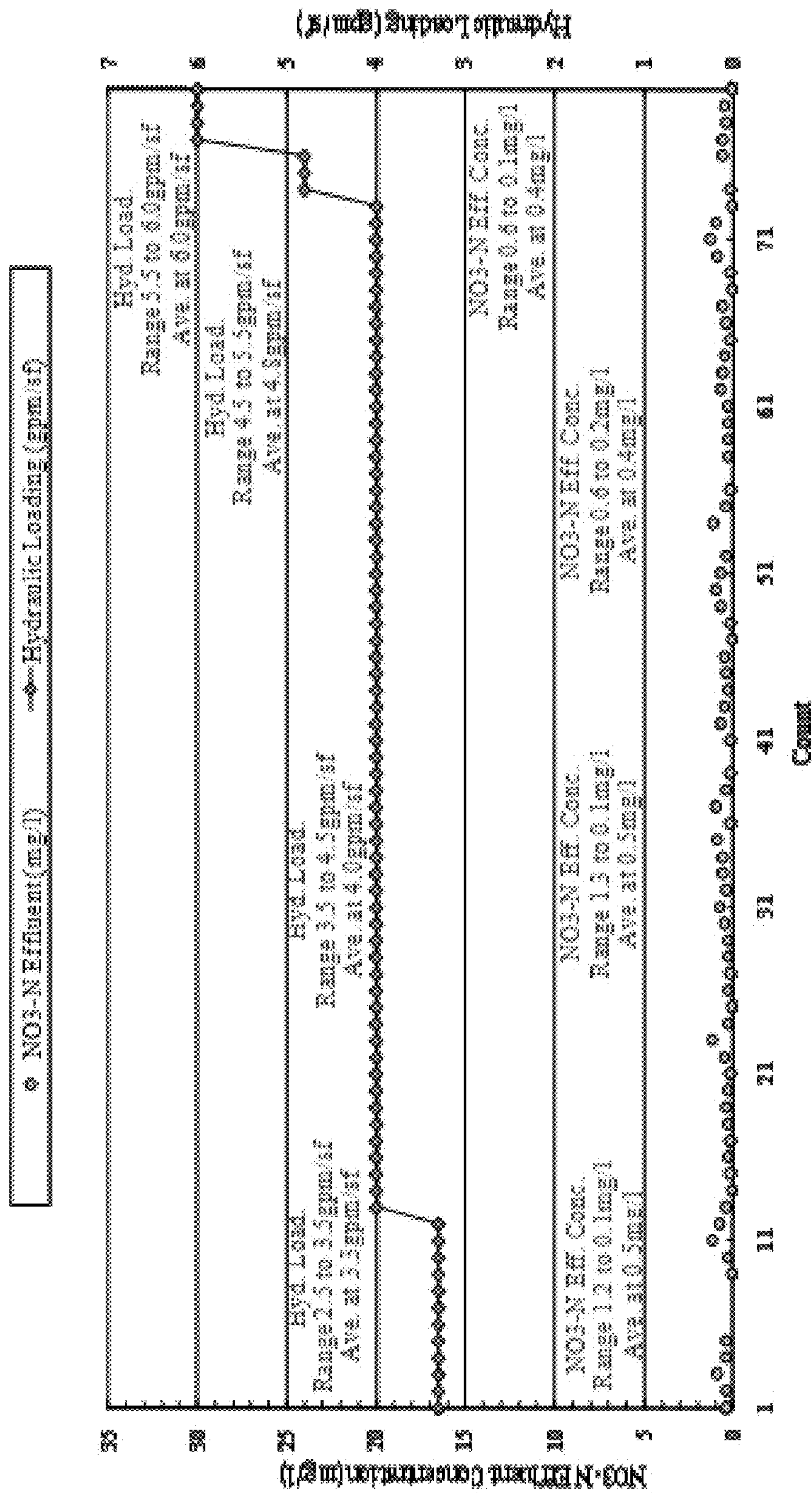
FIG. 2 is a plot illustrating $NO_x$—N concentration versus hydraulic loading rate, results of a system in accordance with some embodiments of the present invention.
Figure 3:
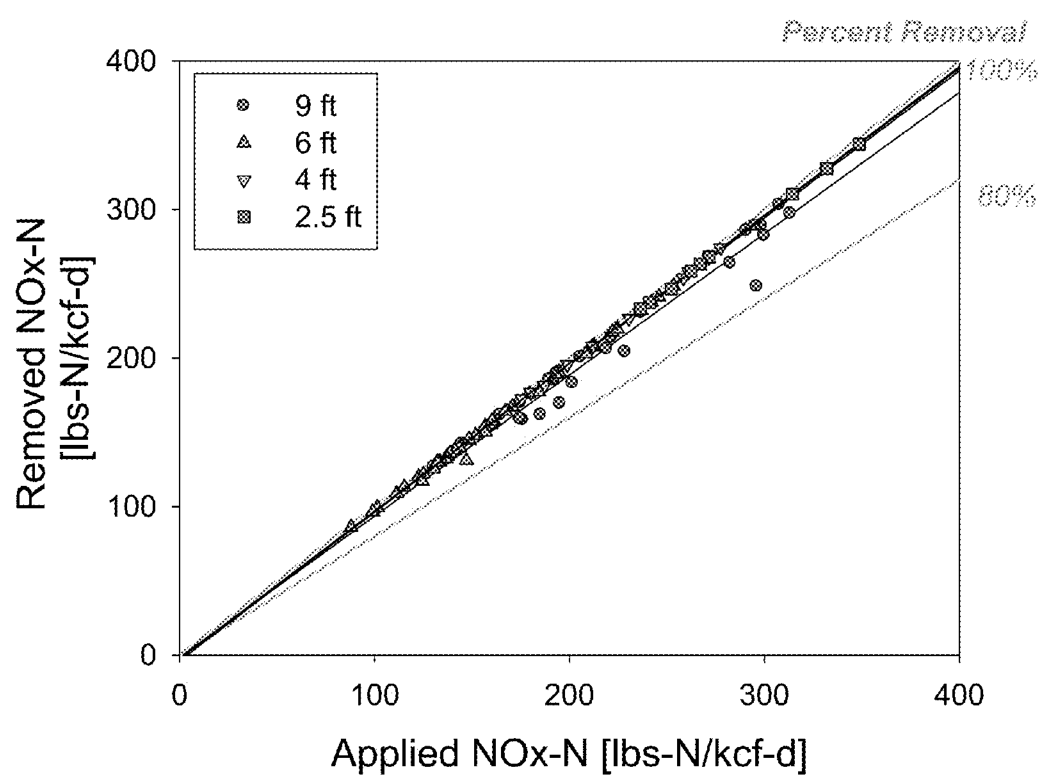
FIG. 3 is a plot illustrating $NO_x$—N applied and removal loading rate, results of a system in accordance with some embodiments of the present invention.

A system in accordance with some embodiments of the present invention was tested per the above-discussed test protocol. As FIGS. 2 and 3 illustrate, systems in accordance with some embodiments of the present invention perform within certain desired parameters, specifically the concentration of $NO_x$—N versus the hydraulic loading rate (as depicted in FIG. 2), and the applied and removal loading rates of $NO_x$—N (as depicted in FIG. 3).

It will be understood that the specific embodiments of the present invention shown and described herein are exemplary only. Numerous variations, changes, substitutions and equivalents will now occur to those skilled in the art without departing from the spirit and scope of the invention. For example various media layers and/or types may be utilized; backwash processes and methodologies may be modified according to specific circumstances and applications. Accordingly, it is intended that all subject matter described herein and shown in the accompanying drawings be regarded as illustrative only, and not in a limiting sense.

What is claimed is:

1. A system for the removal of nitrates from water or wastewater, the system utilizing an anoxic vessel with a plurality of filter beds, at least one inlet, and at least one outlet, the system comprising:

a first filtration bed comprising a first granular and/or angular media, the first granular and/or angular media having a first amount of surface area per volume of the first filtration media, the surface area of the first filtration media configured for biological and physical treatment of the water or wastewater;

a second filtration bed having a depth no less than 10% and no more than 50% the depth of the first filtration bed, the second filtration bed comprising a second granular and/or angular media, the second granular and/or angular media having a second amount of surface area per volume of the second filtration media, the second amount of surface area being less than the first amount of surface area;

wherein the at least one inlet comprises:

an influent inlet by which the water or wastewater enters the vessel;

a carbon source inlet by which a carbon source is introduced into the system to support removal of nitrates in the water or wastewater by microorganisms present in the first granular and/or angular media; and a backwash inlet by which a water only backwash is introduced to the system, the water only backwash removing at least a majority of nitrogen bubbles trapped in interstices of the first or second filtration bed;

wherein the water or wastewater enters the system via the influent inlet, flows through the first filtration bed and the second filtration bed, and exits the vessel through the at least one outlet.

2. The system of claim 1, wherein the first granular and/or angular media ranges in size from 0.1 millimeter to 3 millimeters.

3. The system of claim 1, wherein the first granular and/or angular media is comprised of expanded clay or shale, and/or plastic.

4. The system of claim 1, wherein the first granular and/or angular media is comprised of a blend of different materials.

5. The system of claim 1, wherein the second granular and/or angular media comprises sand having a particle size between 0.1 millimeters to 10 millimeters and a density greater than 1,500 kg/m$^3$.

6. The system of claim 5, wherein the sand has a particle size between 0.5 millimeters and 2.5 millimeters.

7. The system of claim 1, further comprising a third filtration bed, the third filtration bed supporting the second filtration bed and comprising a third granular and/or angular media.

8. The system of claim 7, wherein the third granular and/or angular media is gravel with a particle size between 2 millimeters to 50 millimeters.

9. The system of claim 1, wherein the first filtration bed supports microorganisms for removing nitrates from the water or wastewater, and wherein the second filtration bed assists in suspended solid capture from the water or wastewater.

10. The system of claim 1, wherein the carbon source introduced into the system is methanol, used to assist microorganisms present in the first or second filtration bed in removing nitrates from the water or wastewater.

11. The system of claim 1, wherein the water or wastewater passes through the system due to external forces, the external forces comprising gravity.

12. The system of claim 11, wherein the external forces additionally comprise pressurization.

13. A down flow water or wastewater treatment system for removing nitrates from water or wastewater, the system comprising:

an influent inlet for receiving water or wastewater from a source outside of the treatment system;

a vessel for containing the water or wastewater, the vessel comprising:

a first filtration bed comprised of a first filtration media having a first amount of surface area per volume of the first filtration media, the surface area of the first filtration media configured for biological and physical treatment of the water or wastewater;

a second filtration bed comprised of a second filtration media having a second amount of surface area per volume of the second filtration media, the second amount of surface area being less than the first amount of surface area, the second filtration bed supporting the first filtration bed; and a support bed, the support bed supporting the second filtration bed;

one or more nozzles providing fluid communication between the vessel area adjacent to the support bed and the system outlet, the nozzles providing an exit for effluent after traveling through the vessel;

an effluent outlet, for removing treated water or wastewater from the system;

one or more inlets for the introduction of air scour and water only backwash into the vessel, the inlets providing air scour and backwash water through the nozzles into the support bed, into the second filtration bed, and subsequently into the first filtration bed, the water only backwash removing at least a majority of nitrogen bubbles trapped in interstices of the first or second filtration bed; and a carbon source inlet by which a carbon source is introduced into the system in order to support removal of nitrates in the water or wastewater by microorganisms present in the first filtration media.

14. The system of claim 13, wherein the first filtration bed comprises 50%-89% of the depth of the combined first filtration bed and second filtration bed.

15. The system of claim 13, wherein the first filtration media is comprised of expanded clay, shale, plastic and/or fiber material.

16. The system of claim 13, wherein the first filtration media is comprised of a blend of different materials.

17. The system of claim 13, wherein the first filtration media comprises a material specifically configured with sufficient surface area to support microorganisms for nitrate removal.

* * * * *